Nov. 4, 1930.    T. L. SHERMAN    1,780,365
CRANKLESS ENGINE
Filed Oct. 31, 1929
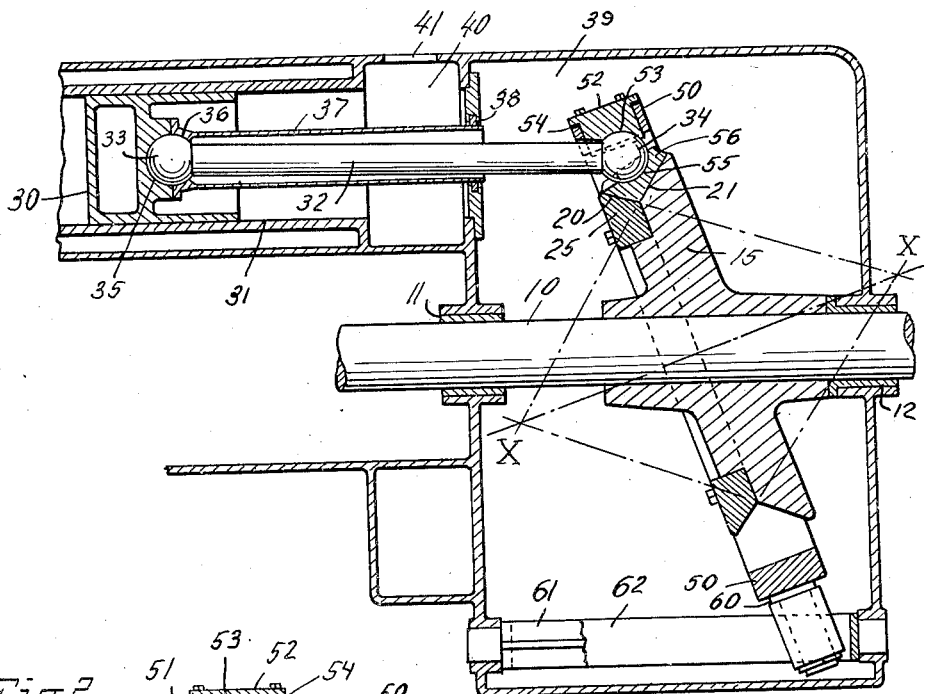
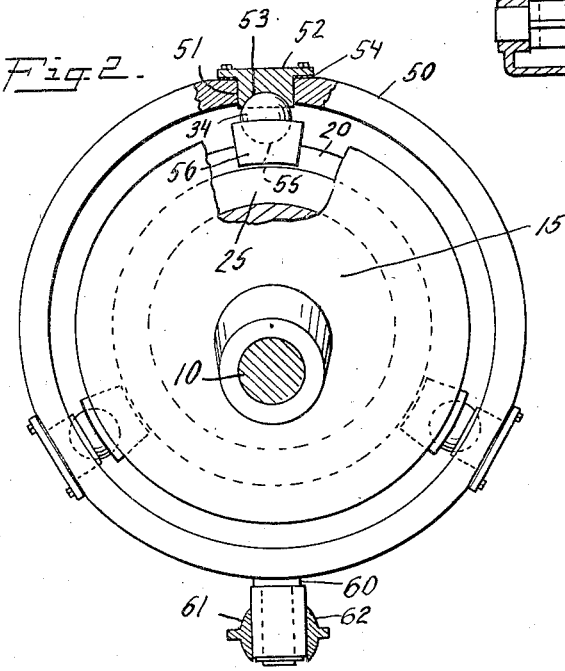
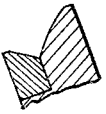
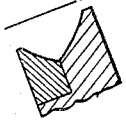
INVENTOR
Thomas L. Sherman
BY
Marshall & Hawley
ATTORNEYS Patented Nov. 4, 1930

1,780,365

UNITED STATES PATENT OFFICE

THOMAS L. SHERMAN, OF MELBOURNE, AUSTRALIA, ASSIGNOR TO MICHELL-CRANK-LESS ENGINES CORPORATION, OF NEW YORK, N. Y., A CORPORATION OF NEW YORK

CRANKLESS ENGINE

Application filed October 31, 1929. Serial No. 403,842.

This invention relates to crankless engines.
More particularly stated, the invention relates to the operative driving connections between reciprocating pistons of a crankless engine and the shaft driven thereby. A crankless engine of the type to which the invention is applicable is disclosed in Sherman Patent No. 1,555,165, granted September 29, 1925, and, as shown in that patent, the pistons of the engine are operatively connected to actuate an oscillating member which in turn through suitable bearings between the oscillating member and a slant or swash plate, causes the rotation of a shaft on which the swash plate or slant is mounted.

This invention has for its salient object to provide a simpler and more efficient driving connection between the pistons or connecting rods and the swash plate or slant.

Further objects of the invention will appear from the following specification taken in connection with the drawings, which form a part of this application, and in which Fig. 1 is a sectional elevation showing a portion of a crankless engine and particularly the connection between the piston rod and swash plate constructed in accordance with the invention;

Fig. 2 is an elevational view, partly in section, showing the connections between the piston and swash plate and between the ring which surrounds the swash plate and the swash plate;

Fig. 3 is a fragmentary elevation of a portion of the periphery of the swach plate, showing the bearing surfaces adapted to be engaged by the slipper as convex; and Fig. 4 is a view similar to Fig. 3 showing the bearing surfaces as concave.

The invention briefly described resides in a bearing connection or driving connection between the piston actuated member, such as a yoke or connecting rod, and the slant or swash plate which is driven or rotated thereby. The piston actuated member is pivotally connected to a bearing element or slipper, which in turn slidably engages the periphery of the swash plate.

Further details of the invention will appear from the following description.

In the form of the invention illustrated, there is shown a shaft 10 journaled in bearings 11 and 12 and having mounted thereon a slant or swash plate 15.

The swash plate has formed on the periphery thereof, a V-shaped groove having inclined bearing surfaces 20 and 21. The surfaces 20 and 21 lie in cones, the axes of which coincide with the axis X—X which passes through the center of the swash plate and is disposed at right angles to the plane of the swash plate.

The bearing surface 21 is shown as formed integral with the swash plate but the bearing surface 20 is formed on a ring 25 which is secured in an annular recess in the swash plate in any suitable manner, as by bolts. If desired, in order to provide for adjustment, shims may be positioned between the ring and the swash plate.

In Fig. 1 a piston 30 is shown mounted in the cylinder 31. A connecting rod 32 is pivotally connected at 33 to the piston and has a spherical bearing or ball 34 formed on its other end. The pivotal connection 33 engages a socket 35 formed in the piston and is engaged by a socket member 36, to which is connected a sleeve 37 which extends through a packing 38 disposed between the swash plate chamber 39 and a chamber 40 intermediate the swash plate chamber 39 and the cylinder 31. An air vent or breather opening 41 is provided in the chamber 40.

A ring 50 is disposed around the periphery of the swash plate and is provided with a plurality of radially disposed openings 51 which receive bearing blocks 52 having spherical sockets 53 formed therein. Shims 54 may be interposed between the bearing blocks 52 and the ring 50 and the blocks are held in position by suitable bolts.

The spherical bearing portions or balls 34 formed on the connecting rods 32 engage the spherical bearing sockets 53 formed in the blocks 52 and also engage spherical sockets 55 formed on slippers or slipper bearing members 56. Each of the slippers has bearing surfaces corresponding in form and shape to the bearing surfaces 20 and 21 formed on the periphery of the swash plate.

The ring 50 is prevented from rotating by means of a stud 60 which projects radially therefrom and is disposed between fixed bearing members 61 and 62.

Any desired number of slippers and bearing blocks may be provided and Fig. 2 shows three connections between the pistons and the swash plate. If desired, the bearing surfaces on the periphery of the swash plate may be formed in the manner shown in Figs. 3 and 4.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a swash plate, a ring surrounding the plate, a reciprocatable element, and means connecting said element to said plate and said ring to said plate.

2. In combination, a swash plate, a ring surrounding the plate, a reciprocatable element, and means having a pivotal connection to said element and a sliding connection with said plate.

3. In combination, a swash plate, a ring surrounding the plate, a reciprocatable element, and means connecting said element to said plate and said ring to said plate, said means including a slipper.

4. In combination, a swash plate, a reciprocatable element, a ring surrounding the periphery of said plate, a bearing member carried by said ring, a bearing member engaging the peripheral portion of said plate, and means connecting said reciprocatable element to said bearing members.

5. In combination, a swash plate, a reciprocatable element, a ring surrounding the periphery of said plate, a bearing member carried by said ring, a slipper engaging the peripheral portion of said plate, and means connecting said reciprocatable element to said bearing member and slipper.

6. In combination, a swash plate, a reciprocatable element, a ring surrounding the periphery of said plate, a bearing member carried by said ring, a bearing member engaging the peripheral portion of said plate, and means pivotally connecting said reciprocatable element to said bearing members.

7. In combination, a swash plate, a reciprocatable element, a ring surrounding the periphery of said plate, a bearing member carried by said ring, a slipper engaging the peripheral portion of said plate, and means pivotally connecting said reciprocatable element to said bearing member and slipper.

8. In combination, a swash plate, a ring surrounding the peripheral portion of said plate, a reciprocatable element having a bearing member, means carried by the ring fitting said bearing member, and means engaging the periphery of the swash plate and engaging the bearing member.

9. In combination, a swash plate, a ring surrounding the peripheral portion of said plate, a reciprocatable element having a spherical bearing member, means carried by the ring fitting said bearing member, and means engaging the periphery of the swash plate and engaging the bearing member.

10. In combination, a swash plate, a ring surrounding the peripheral portion of said plate, a reciprocatable element having a bearing member, means carried by the ring pivotally engaging said bearing member, and means engaging the periphery of the swash plate and pivotally engaging the bearing member.

11. In combination, a swash plate, a ring surrounding the peripheral portion of said plate, a reciprocatable element having a bearing member, means carried by the ring having a spherical socket fitting said bearing member, and means engaging the periphery of the swash plate and engaging the bearing member.

12. In combination, a swash plate, a ring surrounding the peripheral portion of said plate, a reciprocatable element having a bearing member, means carried by the ring having a spherical socket fitting said bearing member, and means engaging the periphery of the swash plate and having a spherical socket engaging the bearing member.

13. In combination, a swash plate, a ring surrounding the periphery thereof, a reciprocatable element, a slipper engaging the periphery of said plate, the connection between the slipper and plate consisting of substantially V-shaped bearing surfaces on one part engaging a substantially V-shaped groove in the other part, and a pivotal connection between said reciprocatable element and said slipper.

14. In combination, a swash plate, a ring surrounding said plate, a slipper bearing member between said ring and plate, and a reciprocatable member pivotally associated with said slipper bearing member.

15. In combination, a swash plate, a ring surrounding said plate, a slipper bearing member between said ring and plate, and a reciprocatable member having a portion disposed between said ring and slipper bearing member.

16. In combination, a swash plate, a ring surrounding said plate, a slipper bearing member between said ring and plate, and a reciprocatable member pivotally associated with said slipper bearing member and ring.

17. In combination, a swash plate, a ring surrounding said plate, a slipper bearing member between said ring and plate, and a reciprocatable member having a portion disposed between said ring and slipper bearing member pivotally associated with said slipper bearing member.

THOMAS L. SHERMAN.